No. 735,416. PATENTED AUG. 4, 1903.
H. W. SOUDER.
ELECTRIC SIGNALING APPARATUS.
APPLICATION FILED MAR. 25, 1902.
NO MODEL. 7 SHEETS—SHEET 1.
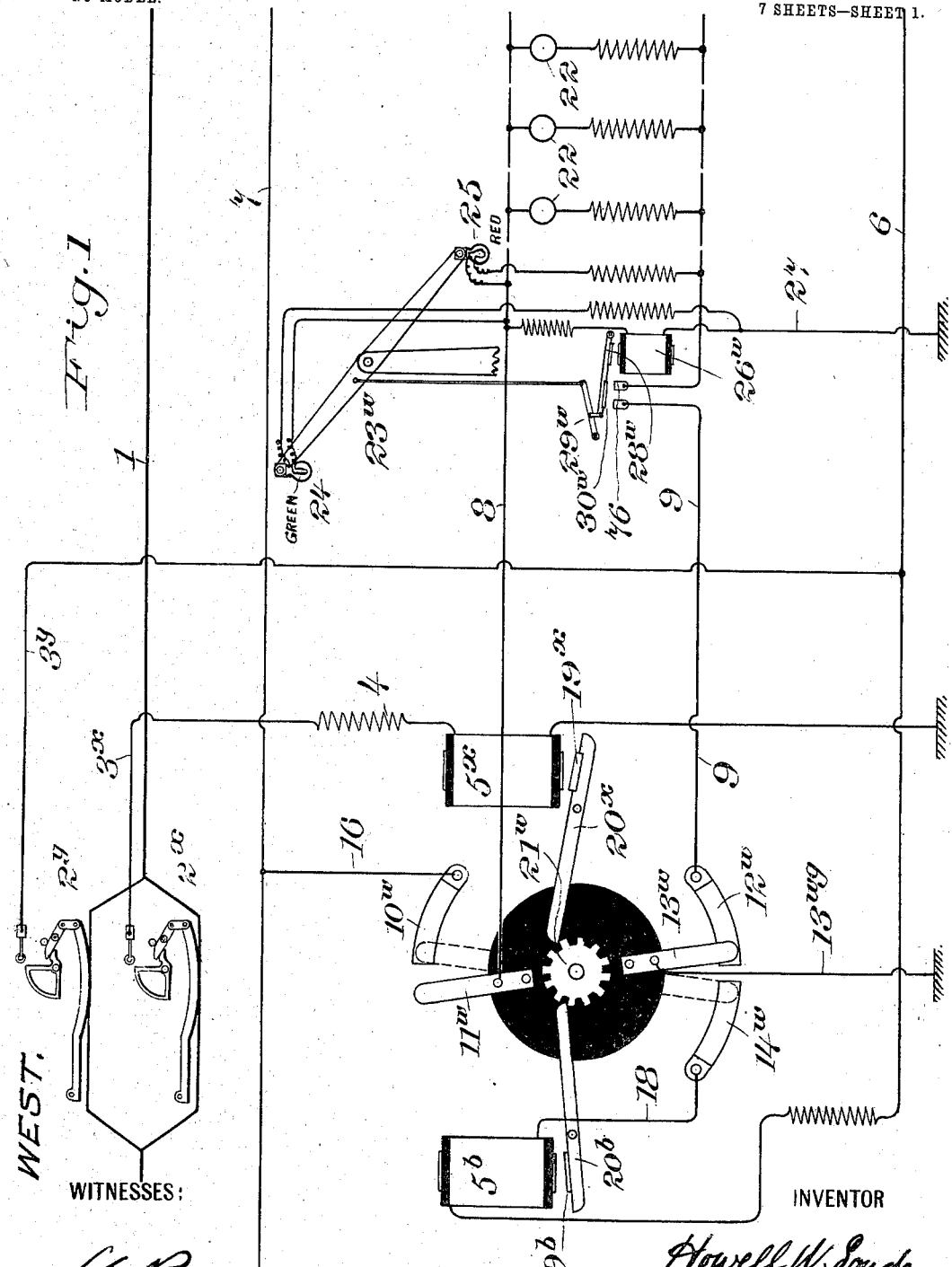
WITNESSES: INVENTOR
Howell W. Souder
BY
ATTORNEY No. 735,416. PATENTED AUG. 4, 1903.
H. W. SOUDER.
ELECTRIC SIGNALING APPARATUS.
APPLICATION FILED MAR. 25, 1902.
NO MODEL. 7 SHEETS—SHEET 2.

No. 735,416. PATENTED AUG. 4, 1903.
H. W. SOUDER.
ELECTRIC SIGNALING APPARATUS.
APPLICATION FILED MAR. 25, 1902.
NO MODEL. 7 SHEETS—SHEET 3.
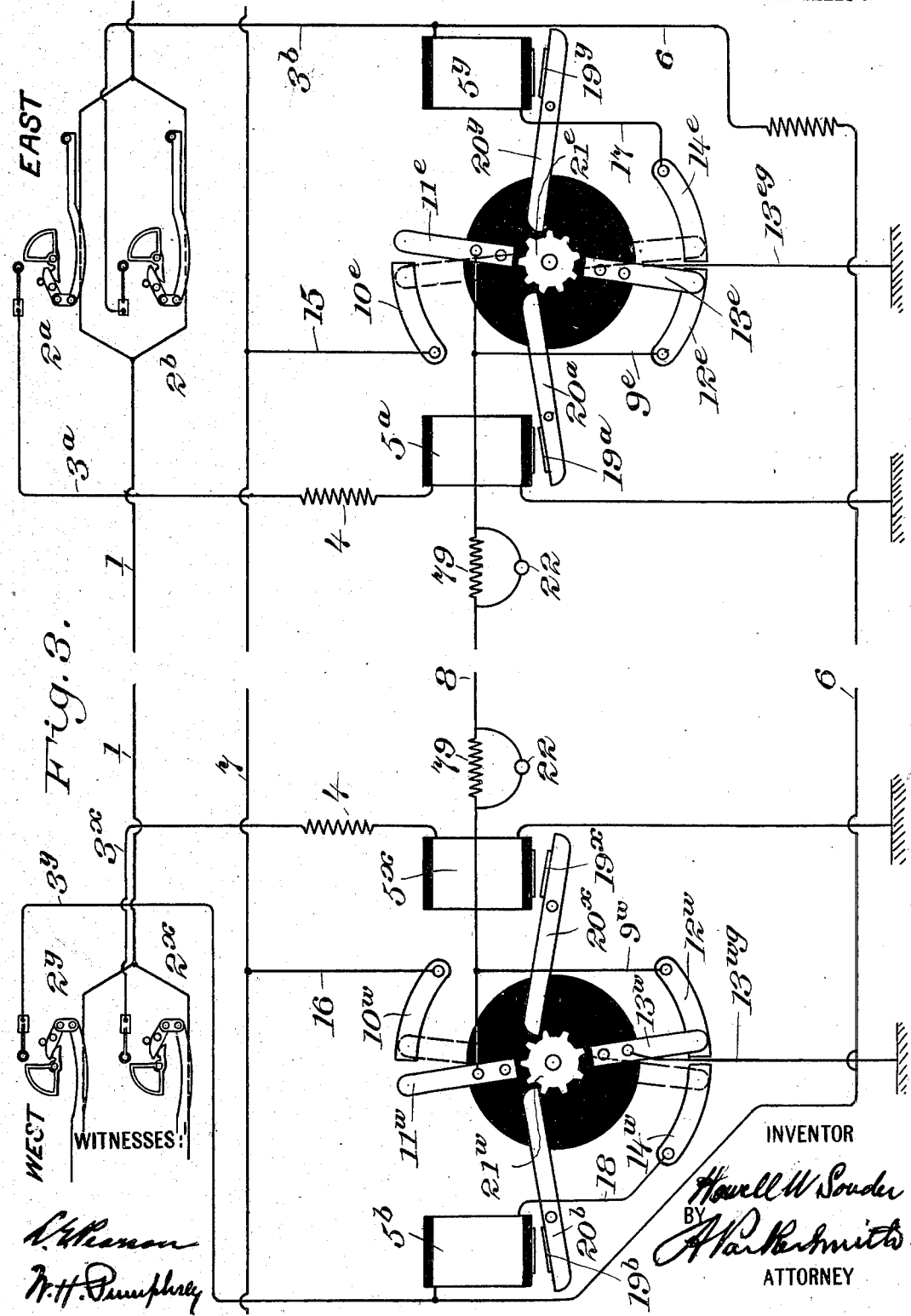

No. 735,416. PATENTED AUG. 4, 1903.
H. W. SOUDER.
ELECTRIC SIGNALING APPARATUS.
APPLICATION FILED MAR. 25, 1902.
NO MODEL. 7 SHEETS—SHEET 4.
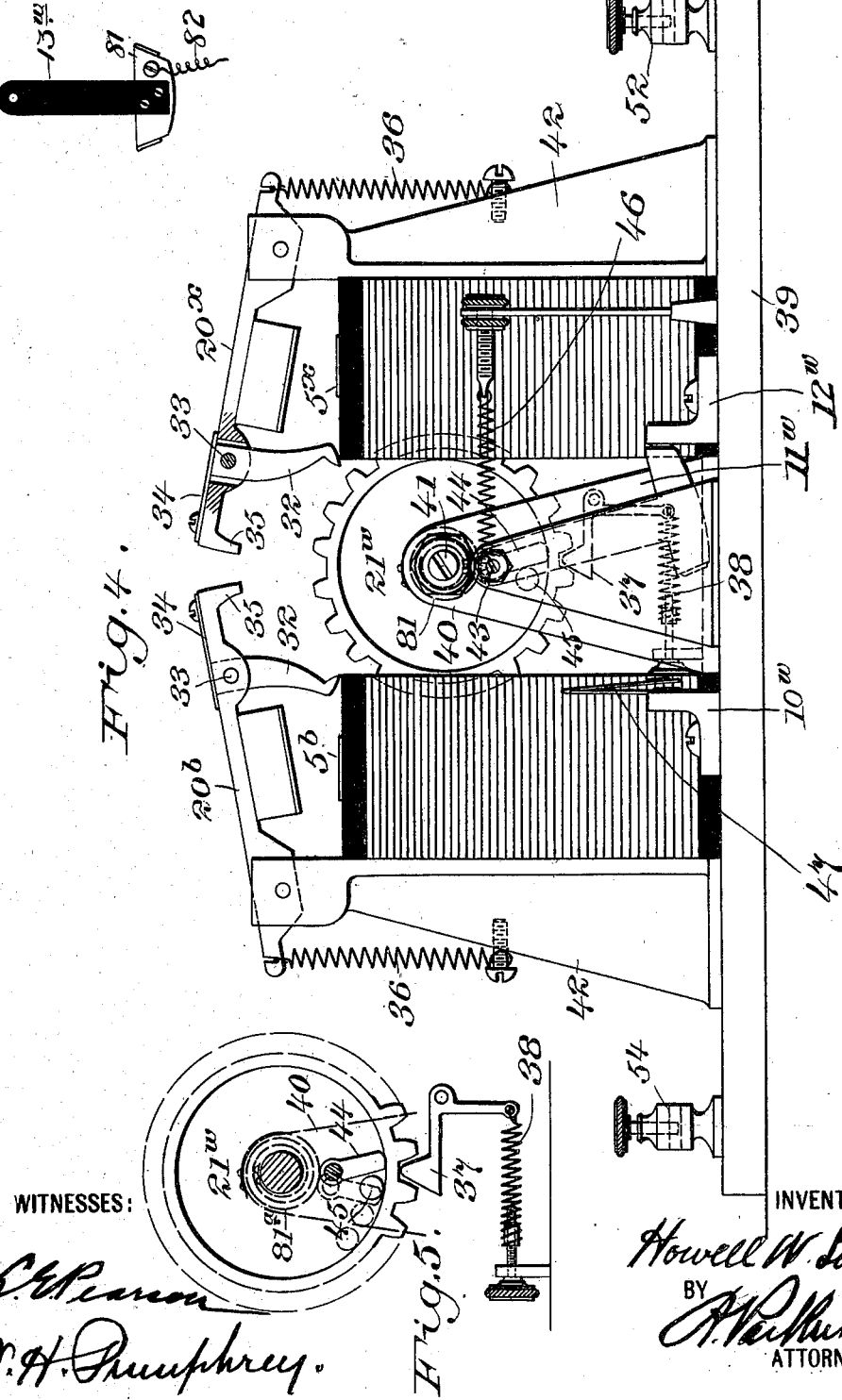

No. 735,416. PATENTED AUG. 4, 1903.
H. W. SOUDER.
ELECTRIC SIGNALING APPARATUS.
APPLICATION FILED MAR. 25, 1902.
NO MODEL. 7 SHEETS—SHEET 5.

Fig. 6.

WITNESSES: INVENTOR
Howell W. Souder
BY
ATTORNEY

THE NORRIS PETERS CO., PHOTO-LITHO., WASHINGTON, D. C.

No. 735,416. PATENTED AUG. 4, 1903.
H. W. SOUDER.
ELECTRIC SIGNALING APPARATUS.
APPLICATION FILED MAR. 25, 1902.
NO MODEL. 7 SHEETS—SHEET 6.
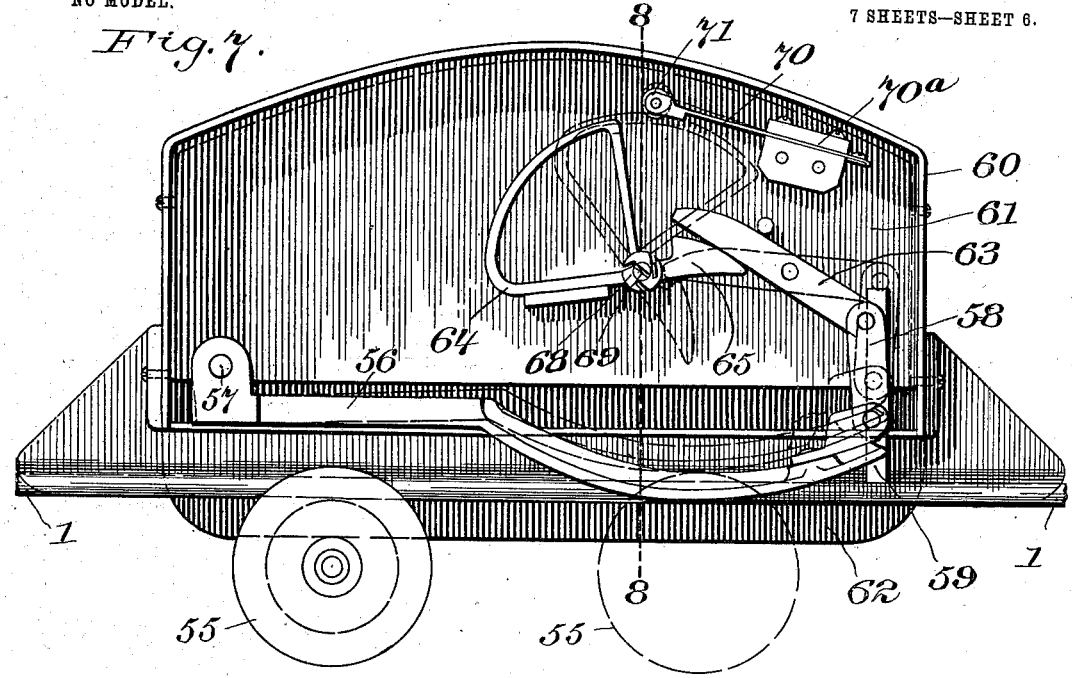
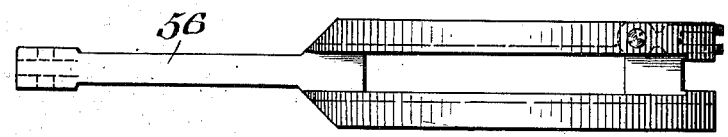
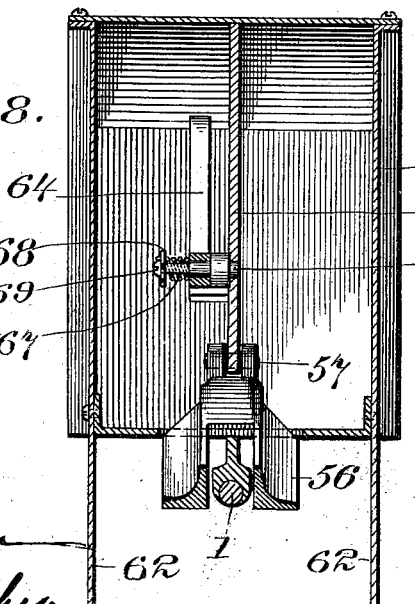
WITNESSES:
INVENTOR
Howell W. Souder
BY
ATTORNEY No. 735,416. PATENTED AUG. 4, 1903.
H. W. SOUDER.
ELECTRIC SIGNALING APPARATUS.
APPLICATION FILED MAR. 25, 1902.
NO MODEL. 7 SHEETS—SHEET 7.
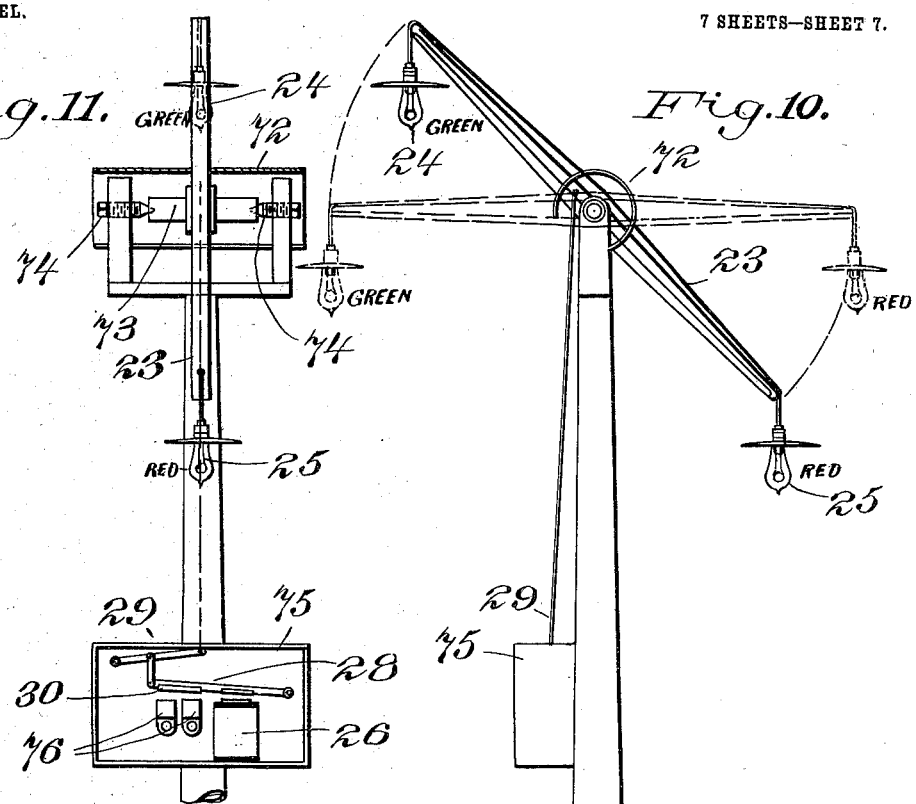
WITNESSES:
INVENTOR
Howell W Souder
BY
ATTORNEY No. 735,416. Patented August 4, 1903.

UNITED STATES PATENT OFFICE.

HOWELL W. SOUDER, OF TAMAQUA, PENNSYLVANIA, ASSIGNOR OF ONE-HALF TO W. D. ZEHNER, OF LANSFORD, PENNSYLVANIA.

ELECTRIC SIGNALING APPARATUS.

SPECIFICATION forming part of Letters Patent No. 735,416, dated August 4, 1903.

Application filed March 25, 1902. Serial No. 99,969. (No model.)

*To all whom it may concern:*

Be it known that I, HOWELL W. SOUDER, a citizen of the United States of America, and a resident of Tamaqua, county of Schuylkill, State of Pennsylvania, have invented certain new and useful Improvements in Electric Signaling Apparatus, of which the following is a specification.

My invention relates generally to electric signaling apparatus, and more specifically consists of an improved block-signaling apparatus capable of use on a single-track electric railway and arranged to guard both ends of each block. In its preferred form it also consists of a system capable of being operated by a series of cars following one another in the same direction, affording information to each motorman of the fact that one or more cars are ahead of him in the block and also affording each motorman immediate information of the fact of the entry of a car into the block from the other direction. At the same time the preferred form of the system affords light for passengers waiting at way-stations and information as to the presence of a car upon the block in which said station is located.

Heretofore various block-signal systems for electric railways have been designed—such, for instance, as that described and claimed in my prior patent, No. 642,379, dated January 30, 1900—but in the majority of these systems the entry of a second car in the same direction as the predecessor into a block disarranges the signals. In nearly all electric railroads it becomes necessary on Sundays and holidays to run a number of cars together or closely following one another in order to handle the increased traffic, these cars being bunched upon the turnouts to enable the cars going in the other direction to pass. My present system permits of this method of operation as well as of the other method of running only one car to a block, and presents other advantages and novel features of construction, which will hereinafter be more specifically described and claimed.

The preferred form of my invention and one or two modifications are illustrated in the accompanying seven sheets of drawings, in which—

Figure 1 is a diagrammatic view of the circuits for one end of a block and signals for one-half of the block and signal-operating apparatus therefor, the lamps or other electrically-operated signals being in multiple arc. Fig. 2 is a similar view of the other half of the same block. Fig. 3 is a diagrammatic view of the circuits, signals, and operating apparatus for a single block in which the lamps or other electrically-operated signals are in series, thereby reducing the amount of wiring necessary. Fig. 4 is a side elevation, partially broken away, of the preferred form of circuit-controller for use in my system. Fig. 5 is a detail view of a portion of the apparatus in said circuit-controller. Fig. 6 is a plan view of the apparatus shown in Fig. 4. Fig. 7 is a side elevation with one plate removed of the preferred form of contact-making device for operating my system. Fig. 8 is a cross-section on line 8 8 of Fig. 7. Fig. 9 is a bottom view of the bifurcated lever used in said contact-making device. Fig. 10 is a side elevation of a semaphore which may be used in my system. Fig. 11 is a detail view of the same, taken at right angles to the plane of Fig. 10, with certain parts removed and others shown in section. Fig. 12 is a vertical central section of a signal-lamp and improved form of reflector therefor, and Fig. 13 is an end elevation of the same. Fig. 14 is a detail sectional view of one of the vibrating switch-arms of the circuit-controller.

Throughout the drawings like reference-figures indicate like parts.

The trolley-wire 1 is divided into two parts at or near the end of each block, and along these divisions are located contact-making devices $2^a$, $2^b$, $2^x$, and $2^y$, as shown in Figs. 1, 2, and 3. At the points of division of the trolley-wire are located frogs, (not shown in detail,) which will cause the trolley-wheel to pass to the right and come in contact with the contact-maker $2^a$ as the car enters the block at the east end and in contact with the contact-maker $2^y$ as the car leaves the block at the west end. In the same way the car entering the block at the west end will be thrown to the contact-maker $2^x$ and on leaving said block at the east end will be thrown to the contact-maker $2^b$. Any convenient form of contact-making device may be employed, and the preferred form herein shown will be described hereinafter. The contact-maker $2^a$ is adapted to connect the wire $3^a$ momentarily with the trolley-wire, and said wire $3^a$ connects with one end of the coil of an electric magnet $5^a$, the other terminal of which is connected to the ground. Any necessary and convenient resistance 4 is inserted in the circuit, and similar resistances (indicated by the same number) are inserted at other points in the system, as shown, being adjusted to properly control the currents passing through the circuits in which they are located. In the same way the wire $3^x$ connects with the contact $2^x$ and extends through the magnet $5^x$ to the ground. The wires $3^b$ and $3^y$ connect, respectively, to the contact devices $2^b$ and $2^y$ and extend to the wire 6, which runs along the block, being connected at each end to one terminal of the magnets $5^b$ and $5^y$. This wire I call the "block-magnet circuit-wire."

The main feed-wire, which usually extends along a trolley-road in the shape of a cable, I represent at 7. This is preferably used as the source of current-supply for operating the signals. The branch wire 15 extends from said main feed-wire and is connected to the contact-piece $10^e$ at the east end of the block. A similar wire 16 extends to the contact-piece $10^w$ in the circuit-controller at the west end of the block. The signal feed-wire 8 extends along the block for the purpose of supplying current to the lamps or other electrically-operated signals. When said lamps or signals are arranged in multiple arc, as shown in Figs. 1 and 2, a second wire 9, which I call the "lamp ground-wire," extends along the block, and these two wires 8 and 9 constitute the mains between which the individual lamp-circuits extend in multiple arrangement.

At each end of the block is located a circuit-controller, which is preferably of the form shown in Figs. 4, 5, and 6, but might be of the construction shown in Figs. 1 and 2, which latter also serve as a diagrammatic representation of the circuits established by the apparatus shown in Figs. 5, 6, and 7. This circuit-controller consists of two vibrating switches $11^e$ and $13^e$, carried on axis 43, and I have marked those in circuit-controller at east end of the block $11^e$ and $13^e$ and those in the circuit-controller at the west end of the block $11^w$ and $13^w$. The switch $11^e$ coöperates with the contact-piece $10^e$, connected to the main feed-wire, as before described, and is normally out of contact therewith when the block is free. Switch $13^e$ coöperates alternately with the contact-piece $12^e$, which is connected to the lamp ground-wire 9, and with the contact-piece $14^e$, which is connected by wire 17 to the free end of the coil of the magnet $5^y$. In the same way the switch $11^w$ coöperates with the contact-piece $10^w$ and the switch $13^w$ with the contact-piece $12^w$, connected to the wire 9 and the contact-piece $14^w$, connected by the wire 18 to the free end of the coil of the electric magnet $5^b$. The lamp signal-wire 8 is connected at one end to the switch $11^e$ and at the other end to the switch $11^w$. The switch $13^e$ is connected to the ground by ground-wire $13^{eg}$, and the switch $13^w$ is connected to the ground by ground-wire $13^{wg}$.

The magnets $5^a$ $5^b$ $5^x$ $5^y$ have corresponding armatures $19^a$ $19^b$ $19^x$ $19^y$, which are connected to or carried by oscillating pawls $20^a$ $20^b$ $20^x$ $20^y$, which are operatively disposed with reference to the ratchet-wheels $21^e$ and $21^w$ of the east and west circuit-controllers. A series of incandescent lamps 22 22 are interposed between the lamp-mains 8 and 9 at convenient points along the block, preferably over platforms of various way-stations or at road-crossings. I may also employ semaphores or other movable devices to carry certain of these lamps, so as to represent by their position the condition of the block between said semaphores, the semaphores being preferably placed at each end of the block. Such semaphores are represented at $23^e$ and $23^w$. Each semaphore-arm carries a green lamp 24, which when elevated indicates that the block is empty, and at the other end a red lamp 25, which when elevated indicates that the block is occupied. These semaphores are operated by magnets $26^e$ and $26^w$ through the intervention of their armatures $28^e$ and $28^w$ and any convenient system of levers $29^e$ and $29^w$. Each of these magnets is in circuit with a wire 27, which extends from signal feed-wire to the ground. To afford a telltale which will indicate the failure of either of these semaphores to act, I employ bridge-pieces $30^e$ and $30^w$, carried by the armatures of the magnets, to complete the circuit through the lamp ground-wire by bridging over the contact-points 76 76 when the semaphore is in the position of danger, indicating that the block is occupied. It is evident, however, that the semaphores and the corresponding means for breaking the circuit across the contact-point 76 76 might be omitted from the system.

Such being the parts of the system represented diagrammatically in Figs. 1 and 2, the operation thereof is as follows: A car entering the block at the east end has the trolley-wheel switched over, so as to come in mechanical contact with the contact-making device $2^a$, and thereby momentarily throws the wire $3^a$ into circuit with the trolley-wire and causes the current to pass through the electromagnet $5^a$. This vibrates the pawl $20^a$, which causes the ratchet-wheel $21^e$ of the east circuit-controller to move one tooth, swinging the vibrating switches $11^e$ and $13^e$ into the position shown in dotted lines. This first establishes a circuit from the main feed-wire 7 through wire 15, contact-piece $10^e$, switch $11^e$, signal feed-wire 8, and semaphore-magnets $26^e$ and $26^w$ and also through lamps 24 24 to the ground. The semaphore-magnets attract their respective armatures $28^e$ and $28^w$, set both of the semaphores at "danger," with the red lamps 25 elevated, and bring the bridge-pieces 30$^e$ and 30$^w$ down upon the contact-points 76, thereby establishing continuity of the lamp-ground 9. The switch 13$^e$ of the east circuit-controller having been shifted into the dotted-line position, there is no ground connection for the lamp ground-wire at that end of the block. The west circuit-controller, however, being undisturbed, there is a ground connection through the contact-piece 12$^w$, switch 13$^w$, and ground-wire 13$^{wg}$. Accordingly current passes through all the lamps 22 and 25 and same are caused to glow, indicating to the motorman (for a reason hereinafter to be explained) that no car has entered the block from the other end and illuminating the platforms at the way-stations to show the motorman whether or not there are any waiting passengers and to show the passengers that a car will soon approach. The red lamps 25 25 are connected across the lamp-mains 8 and 9 and glow only when the other lamps 22 22 are lighted—that is, after both semaphores have operated. The green lamps 24 24 are in direct ground-circuits from signal feed-wire 8, and will consequently glow whenever the circuit-controller is operated by the entrance of a car at either end of the block, whether one or both or neither of the semaphores has operated. The glowing of the red lamp is therefore an assurance to the motorman that the semaphore at the other end of the block has been set and that the block is guarded. The glowing of the green lamp serves at night to show to the motorman the position of the semaphore-arm at his end of the block, whether the rest of the system operates or not. When the car has passed through the block and reaches the western end, its trolley-wheel is switched over into engagement with the contact-making device 2$^y$, which sends a current from the trolley-wire through the wire 3$^y$ down to the block-magnet circuit-wire 6. The west circuit-controller being in position shown in the full lines, there is no ground connection for the magnet 5$^b$, and the same is therefore unaffected. The east circuit-controller being in position shown in the dotted lines, however, there is a ground connection for the magnet 5$^y$ through the wire 17, contact 14$^e$, switch 13$^e$, and wire 13$^{eg}$. Accordingly this magnet is energized and the pawl 20$^y$ vibrated, thereby reversing the circuit-controller, throwing the parts into the position shown in full lines, breaking the circuit to the signal feed-wire, and putting out the lamps, allowing the semaphores to return to the safety position with the green lamp elevated, said semaphores being actuated by a weight or spring upon such return movement. The same movement of the circuit-controller reëstablishes the ground connection for the lamp ground-wire at the east end of the block, so that the system is again in position to be operated by a car entering either end of the block. The east-bound car entering the west end of the block operates the contact-making device 2$^x$, shifting the west circuit-controller in the same manner previously described with reference to the east circuit-controller and throwing all the lamps into operation, setting the semaphores at "danger." On passing out of the block at the east end the car coöperates with the contact-making device 2$^b$ in the manner before described with reference to the one 2$^y$ to reset the system at "safety." If a second car enters a block in the same direction as a previous car, it will evidently merely operate the circuit-controller to the extent of another tooth of the ratchet-wheel, and the switch sliding along the contacts 10$^e$ and 14$^e$ or 10$^w$ and 14$^w$ will not disturb the circuits already established. The first car passing off of the block will actuate the circuit-controller backward one tooth without disturbing the circuits established; but the second car passing off of the block will reverse the circuit-controllers and reëstablish the signals at "safety." The same principle of operation applies to any number of succeeding cars, and the advantage is thereby secured of obtaining a system which will operate with any number of cars in the block so long as they are going in the same direction, the first car into the block setting the signals and the last car out of the block setting them back. If, however, after one or more cars has entered at one end of the block a car enters the other end of the block going in the opposite direction, it is evident that both circuit-controllers will be thrown into the dotted-line positions and both ground connections for the lamp ground-wire will be severed, thereby putting out all the lamps except the green lamps on the semaphore-arms, thereby indicating to every motorman on the block that there is a car ahead of him going in the opposite direction or that something has happened to the signal system. Accordingly the instructions should be upon passing a lamp which is not glowing to get the car well under control and upon passing a second lamp which is not glowing to "flag" or "feel" the way to the end of the block.

In the multiple-arc system (shown in Figs. 1 and 2) the breaking of one lamp will not put the others out of commission. In the series system (shown in Fig. 3) the breaking of one lamp will destroy the whole system unless resistance-shunts 79 79 are put in around each lamp. In such case the breaking of one lamp will merely reduce slightly the amount of current passing through the line and cause the remaining lamps to burn somewhat less brilliantly. In the series system a second lamp-main 9 is done away with, the branch connections 9$^e$ and 9$^w$ from the signal feed-wire to the contact-pieces 12$^e$ and 12$^w$, respectively, affording the necessary ground connections. I have shown no semaphores in the series system, as the same may of course be dispensed with in this or in the other system and the glowing or failure to glow of lamps alone be relied upon for information as to the condition of the block. This series system I do not herein claim, as the same, with certain additional features, is described and claimed in my pending application, Serial No. 128,280, filed October 22, 1902.

The preferred form of circuit-controller used in my system, as fully illustrated in Figs. 4, 5, and 6, consists of the magnets, as shown, which I have marked $5^b$ and $5^x$, assuming the circuit-controller shown to be the west circuit-controller, and the system of pawls operated thereby. The details of these pawls comprise the main pawl-levers $20^b$ and $20^x$, the actuating-pawls 32 32, pivoted thereto at 33 33 and controlled by the plate-springs 34 34, the checking-pawls 35 35, which engage the ratchet-wheel $21^w$ at the end of the pawl-stroke and prevent its momentum carrying it a distance of more than one tooth, and the retracting-springs 36 36. The pawls are shown mounted on posts 42 42. The ratchet-wheel is held in position after the pawls have been retracted by the springs 36 by locking-pawl 37, controlled by the adjustable spring 38. This locking-pawl is made V-shaped, as shown, and serves to drive the ratchet-wheel through the last portion of its motion in case the actuating-pawl is withdrawn before it completes its circuit. The apparatus is all mounted on an independent base 39, so that it may be removed as a whole for replacement or repair. The ratchet-wheel is journaled in a frame 40, its shaft being supported, preferably, between cone bearing-screws 41 41.

The vibrating switches $13^w$ and $11^w$ are carried on a shaft 43, journaled in the ratchet-wheel-supporting frame 40 at one end and in a support 80 at the other end, as best shown in Fig. 6. These vibrating switches consist of arms, of fiber or other insulating material, fast upon the shaft 43, carrying metal contact-tips 81 81, to which flexible wires 82 82 are connected, as shown in Fig. 6. The shaft 43 carries a radial arm 44, (shown in Figs. 4 and 5,) which is arranged to press against the pin 45, carried by ratchet-wheel $21^w$, through the action of a spring 46, one end of which is attached to a radial projection 83 on the shaft 43, while the other end is attached to a set-screw, as shown in Figs. 4 and 6. To insure close contact and also produce a retarded breaking of the circuit on the return of the switch, the contact-pieces $14^w$ and $10^w$ are preferably provided with spring-faces 47, as best shown in Fig. 4. The terminals of the magnet $5^x$ are soldered to the binding-posts $48^x$ and 49. The supply-wire $3^x$ is inserted in the binding-post $48^x$, and a ground-wire is inserted in the binding-post 49. The terminals of the magnet $5^b$ are soldered to the binding-posts $48^b$ and 50. The block-magnet circuit-wire 6 is inserted in the binding-post $48^b$ and the connecting-wire 18 inserted in the binding-post 50. The contact $12^w$ is connected to the binding-post 51, into which the lamp ground-wire 9 is inserted or the branch wire $9^w$, if the series system is used, and the contact-piece $10^w$ connected to the binding-post 54, into which the main feed-wire connection 16 is inserted. The switch $13^w$ is connected to the binding-post 53, into which a ground-wire is inserted, and the switch $11^w$ is connected to the binding-post 52, into which the signal feed-wire 8 is inserted. The circuit-controller placed at the east end of the block has similar connections to it, following out the notation of the diagram Fig. 2 in the same manner as the notation of diagram Fig. 1 has been followed above. The operation of this circuit-controller is the same in principle as that of the diagrammatic one before described. The energizing of the magnet $5^x$ causes the pawl $20^x$ to be pulled down, and one of the actuating-pawls 32 rotates the ratchet-wheel $21^w$ to the right hand one tooth. This brings the parts to the position shown in dotted lines in Fig. 5, as the spring 46 causes the bell-crank 44 to follow the pin 45. This throws the switches $13^w$ and $11^w$ into contact with the contact-pieces $14^w$ and $10^w$ and establishes the circuits before described. If a second car enters the block in the same direction, the pawl $20^x$ is again operated and the ratchet-wheel turned another tooth; but the position of the switches is not disturbed, as the pin 45 simply moves away from the bell-crank 44 one tooth for each entering car, as also indicated in dotted lines in Fig. 5. Upon a car passing out of the block the magnet $5^b$ pulls down the pawl $20^b$, rotating the ratchet-wheel backward one tooth; but the switches are not disturbed until the last car passes out of the block, when the pin 45 carries the bell-crank lever 44 along with it and reëstablishes the arrangement of parts shown in Fig. 4. Inasmuch as the first part of the backward movement of the switch $13^w$ breaks the circuit through the magnet $5^b$, I may insure the complete working of the ratchet mechanism for the distance of a full tooth in this operation which throws the switch back by employing the spiral spring $81^a$, the inner end of which is fastened to the ratchet-wheel shaft, while the outer end is fast to the stationary support 40. This spring tends to throw the ratchet-wheel around in the same direction as does the pawl $20^b$. Said pawl will drive the ratchet-wheel through the first half of its movement positively until the switch $13^w$ leaves the contact $14^w$. This suffices to withdraw the locking-pawl 37 from between the teeth, and the spring 81 will then compel the completion of the movement of one tooth with certainty. In practice, however, I do not find such spring 81 absolutely necessary, as the momentum of the parts is usually sufficient to complete the reversal of the contacts.

As before stated, various contact-making devices may be used for producing the initial circuit necessary to actuate the magnets of the circuit-controller and operate my system. The preferred form, however, is illustrated in Figs. 7, 8, and 9 of the drawings. The passing trolley-wheel is represented at 55. As it runs along the trolley-wire 1 to the dotted-line position it strikes the bifurcated lever 56, which is pivoted at 57 and straddles the trolley-wire. The other end of this lever is connected by link 58 with the rock-arm 63 and guided by the post 59. The guide-post 59 is carried by the central partition 61 of the casing 60, which incloses the entire apparatus, and is provided with downwardly-projecting guard portions 62 62 to protect the parts and the trolley-wire from snow and sleet. The other end of the rock-arm 63 presses down upon the toe 65, which projects from the sector 64, which is journaled upon the stud 66, carried by the central partition 61. This sector is preferably made eccentric with reference to its center of vibration, so that when thrown up into position shown in dotted lines into contact with the roller 71, carried by spring-arm 70, there is a tendency of the roller to throw the sector back when the lever 56 is dropped back after the passage of the trolley-wheel. This action of the sector to free itself is also assisted by spiral spring 67, which is wound around the stud 66 and has one end fastened to the sector, while its outer end is fastened in the washer 68, which has a square opening which fits over the squared end on the stud-shaft 66 and is held in place by the screw 69. If it is desired to increase the tension of said spring, the screw 69 is withdrawn part way and the washer slipped off of the squared head and turned around until the necessary tension is produced. It is then placed back upon the squared head and the screw fastened down to hold it. The casing and all parts, including the sector, are in electrical connection with the trolley-wire, except the spring-arm 70, which is mounted in an insulating-block 70$^a$ and connected with the corresponding wire 3$^a$, 3$^b$, 3$^x$, or 3$^y$, as the case may be. The operation of this portion of the device is of course evident from the foregoing description. The passing trolley-wheel forces the sector up into contact with the roller 71 and establishes a connection between the magnet of the signal system and the trolley-wire in the manner described. After the trolley-wheel has passed the eccentric sector is forced out of engagement with the roller 71 and the circuit is broken.

The preferred form of semaphore construction is illustrated in Figs. 10 and 11. Outside of the parts previously described is the curved protecting-shell 72, carried by the semaphore-arm, which surrounds the bearings for the semaphore-arm to protect the same from the weather and also to limit the motion of the arm by causing the edges of the shell to strike against the post. The bearings preferably consist of the semaphore-shaft 73, supported between cone-screws 74 74, carried in the forked upper portion of the semaphore-post. The semaphore-magnet and lever system are inclosed in a casing 75, one plate of which is removed in Fig. 11 to show the interior construction. The operation of the lever system of the magnets has been previously described.

The preferred form of lamp for combined lighting and signaling purposes consists of the incandescent lamp 22, mounted in the reflector 77, open at the bottom and arranged to throw the light of the lamp downward and also provided with lateral openings in line with the track, which have colored lenses 78 78, so that the motorman of the approaching car may recognize the lamp as a signal-lamp and be governed by the appearance thereof.

From the foregoing description of the construction and operation of the various parts of my invention it is evident that each car on entering a block will operate to set the semaphores at "danger" and light all lamps along that block. Successive cars entering the block, as where two or three are run together from switch to switch, will not vary the condition of the signals. The last car leaving the block will put the lamps out and reset the semaphores at "safety." If cars enter the block from opposite ends, the lamps will be immediately put out; but the semaphores will remain at "danger" and will not go back to "safety" until all the cars have left the block. The semaphores, therefore, will indicate absolutely whether or not any car is upon the block, while the extinguishment of the lamps will indicate to the motorman of a car on the block the approach of a car in the opposite direction. If a car backs off of the block, the action of the signals is not thereby disarranged. The semaphores are reset at "safety" and the lamps extinguished.

The advantages of the invention comprise the capacity of the system to handle any number of cars on the block running in the same direction, the complete character of the information given to the motorman and to the public as to the condition of the block, the lighting of platforms by signal-lamps, the immediate indication to all concerned of any failure of any part of the apparatus to operate, and the interchangeability of the parts, one standard form of circuit-controller and one standard form of contact-maker being duplicated throughout the system.

An advantage arising from the use of the contact-lever 56, formed with the arc-shaped portion which normally projects below the trolley-wire in such relation thereto that the trolley-wire occupies the position of the chord of the arc, is that said lever is operated with equal certainty and smoothness by the trolley-wheels of cars passing in either direction.

It is evident, of course, that various changes could be made in the details of construction without departing from the spirit and scope of my invention so long as the principles of operation above explained be preserved. Various portions of my invention might be employed without other portions to produce a partial result. Thus the semaphores may be dispensed with, and other forms of signals may be substituted for the lamps. The feature of the breaking of the circuit by the operation of the semaphores may be dispensed with even if the semaphores themseves be retained. The system might be operated by batteries or independent sources of current-supply and so be applicable to railroads operated by other than electric power. Other forms of circuit-controllers might be substituted for those described so long as they handle the circuits in the manner explained. Other motor agencies might be substituted for the magnets, or magnets or other electrical agencies might be employed simply to control independent motive powers employed to shift the circuits or the signals. All these and other modifications which might be worked out in practice I should still consider within the scope of my invention so long as the underlying principle thereof is retained.

The division of the trolley-wire 1, so as to lead to either of the contact devices $2^a$ $2^b$ at one end of the block or to either of those $2^x$ $2^y$ at the other end of the block, according to the direction in which the car is traveling, may correspond to the division of said wire for the track-turnouts at the end of the block, or separate divisions of the wire for this especial purpose may be made at each end of the turnout. In the first case the car would make the contacts while on the turnout. In the second case it would make the contacts just before entering and just after leaving each turnout. I prefer the second arrangement, as it permits of skipping some of the turnouts, as is often desirable in the days or seasons when few cars are run. The cars running back and forth over the straight main track can make better time than is the case when they have to slow down and run over every siding. Furthermore, with this second arrangement there is no possibility of a car running back over a contact which should only be operated by a car going forward. The only advantage of the first arrangement is the economy resulting from reducing the number of contact devices and frogs used.

Having therefore described my invention, what I claim as new, and desire to protect by Letters Patent, is—

1. In a block-signal system for electric railways having a plurality of blocks or signal-sections, the combination of a plurality of electric signals a suitable number located along each section, a source of current-supply, a feed-wire to the signal or signals on each section adapted to be connected to the source of current-supply at either end of each section, a normally open circuit-controller in said connection at the end of each section, a ground connection for said signals at the end of each section, a normally closed circuit-controller in each of said ground connections, means operated by a car on entering either end of each section to close the circuit-controller in the supply connection and open that in the ground connection at that end of the section, and means operated by a car on leaving either end of a section to reverse both of said last-mentioned circuit-controllers, said operating means consisting of one or more electromagnets, and contact devices operated by the passing car to throw the coils of said magnets into circuit with the source of current-supply, a ratchet connected to the circuit-controllers and pawls therefor connected to the armatures of the magnets.

2. In a block-signal system for electric railroads having a plurality of blocks or signal-sections, the combination of a plurality of electric lamps arranged along each block in multiple arc, a source of current-supply, a normally open circuit-controller located at each end of each block and adapted to establish connections between the source of current-supply and one of the lamp-mains, a ground connection at each end of each block for the other lamp-main, a normally closed circuit-controller in each of said ground connections, means operated by a car on entering either end of each section to close the circuit-controller in the supply connection and open that in the ground connection at that end of the section, and means operated by a car on leaving either end of a section to reverse both of said last-mentioned circuit-controllers.

3. In a block-signal system for electric railroads having a plurality of blocks or signal-sections, the combination of a plurality of electric lamps arranged along each block in multiple arc, a source of current-supply, a normally open circuit-controller located at each end of each block and adapted to establish connections between the source of current-supply and one of the lamp-mains, a ground connection at each end of each block for the other lamp-main, a normally closed circuit-controller in each of said ground connections, means operated by a car on entering either end of each section to close the circuit-controller in the supply connection and open that in the ground connection at that end of the section, and means operated by a car on leaving either end of a section to reverse both of said last-mentioned circuit-controllers, said operating means consisting of two electromagnets and two contact devices operated by the passing car to throw the coils of one or the other of said magnets momentarily into circuit with the source of supply.

4. In a block-signal system for electric railroads having a plurality of blocks or signal-sections, the combination of a plurality of electric lamps arranged along each block in multiple arc, a source of current-supply, a normally open circuit-controller located at each end of each block and adapted to establish connections between the source of current-supply and one of the lamp-mains, a ground connection at each end of each block for the other lamp-main, a normally closed circuit-controller in each of said ground connections, means operated by a car on entering either end of each section to close the circuit-controller in the supply connection and open that in the ground connection at that end of the section, and means operated by a car on leaving either end of a section to reverse both of said last-mentioned circuit-controllers, said operating means consisting of two electromagnets and two contact devices operated by the passing car to throw the coils of one or the other of said magnets momentarily into circuit with the source of supply, a ratchet-wheel geared to the circuit-controllers and a pawl connected to the armature of each magnet and coöperating with said ratchet-wheel.

5. In a block-signal system for electric railroads having a plurality of blocks or signal-sections, the combination of the source of current-supply, the electrically-operated signals for each block, a current-controller located at the end of each block adapted to cut in or cut out the signals for that block, a magnet for each controller adapted to operate the controller to produce the cutting in of the signals, said magnet being provided with a permanent ground connection and a momentary connection with the source of current-supply on the entry of a car into the block, a second magnet for each end of the block adapted to produce the cutting-out action of the circuit-controller, each of said second magnets being provided with a ground connection adapted to be cut in and cut out by the circuit-controller simultaneously with the cutting in and cutting out of the signals, the other terminals of these second magnets being connected together by a wire which is provided with a branch at each end of the block adapted to be momentarily connected with the source of current-supply by a car passing out of that block.

6. In a block-signal system for electric railroads having a plurality of blocks or signal-sections, the combination of a plurality of electric lamps, one or more located along each block, a source of current-supply, a feed-wire to said lamp or lamps adapted to be connected to the source of current-supply at either end of each block, a normally open circuit-controller in each of said connections, a ground connection for said lamps at each end of the block, a normally closed circuit-controller in each of said ground connections, means operated by a car on entering either end of a block to close the circuit-controller in the supply connection and open that in the ground connection at that end of the block, and means operated by a car on leaving either end of a block to reverse both of said circuit-controllers, together with semaphores located one at the end of each block and carrying certain of said signal-lamps, a magnet for throwing each of said semaphores into the "danger" position, and a circuit extending from the lamp feed-wire through the magnet-coils to the ground.

7. In a block-signal system for electric railroads having a plurality of blocks or signal-sections, the combination of a plurality of electric lamps arranged along each block in multiple arc, a source of current-supply, a normally open circuit-controller located at each end of each block and adapted to establish connections between the source of current-supply and one of the lamp-mains, a ground connection at each end of each block for the other lamp-main, a normally closed circuit-controller in each of said ground connections, means operated by a car on entering either end of each section to close the circuit-controller in the supply connection and open that in the ground connection at that end of the section, and means operated by a car on leaving either end of a section to reverse both of said last-mentioned circuit-controllers, together with semaphores located one at the end of each block and carrying certain of said signal-lamps, a magnet energized by current from one of the lamp-mains adapted to throw its corresponding semaphore into the "danger" position, and a circuit-breaker in the other lamp-main operated by the semaphore to break the circuit through said lamp-main when the semaphore is at "safety."

8. The combination of the vibrating switch, the contact-points between which it vibrates, a ratchet-wheel having a yielding connection to said switch, oppositely-disposed vibrating pawls meshing with said ratchet-wheel, the parts being so proportioned that a single vibration of either pawl will produce an angular movement of the ratchet-wheel equal to the angular movement of the switch between the two contact-points, and means for vibrating said pawls.

9. The combination of the vibrating switch, the contact-points between which it vibrates, a ratchet-wheel having a yielding connection to said switch, oppositely-disposed vibrating pawls meshing with said ratchet-wheel, the parts being so proportioned that a single vibration of either pawl will produce an angular movement of the ratchet-wheel equal to the angular movement of the switch between the two contact-points, and electromagnets controlling said pawls.

10. The combination of the vibrating switch, the contact-points between which it vibrates, a ratchet-wheel having a yielding connection to said switch, oppositely-disposed vibrating pawls meshing with said ratchet-wheel, the parts being so proportioned that a single vibration of either pawl will produce an angular movement of the ratchet-wheel equal to the angular movement of the switch between the two contact-points, one or more of said switch-contacts being of a yielding nature.

11. The combination of the vibrating switch, the contact-points between which it vibrates, a ratchet-wheel provided with a pin which engages one side of the vibrating switch, a spring which tends to maintain the switch in engagement with the pin, vibrating pawls adapted to rotate the ratchet-wheel in opposite directions, the parts being so proportioned that a rotation of the ratchet-wheel to the extent of one tooth is sufficient to swing the switch from one contact-point to the other, and electromagnets for operating said pawls.

12. In a signal system for electric railways having a plurality of blocks, the combination of a source of current-supply, a semaphore, means for shifting said semaphore to "danger" position when a car enters either end of the block, and an electric signal-lamp carried by said semaphore, feed-wires for said lamp, means for connecting said feed-wires with the source of current-supply simultaneously with the shifting of the semaphore, the circuit through the lamp and the feed-wires being normally open at a point adjacent to the semaphore, a bridge-piece for closing said opening and a connection between the semaphore and the bridge-piece adapted to produce simultaneous movement of the two.

Signed at Tamaqua, Pennsylvania, this 14th day of March, 1902.

HOWELL W. SOUDER.

Witnesses:
   GEO. C. NOLL,
   F. P. BOAS.